(12) United States Patent
Locker et al.

(10) Patent No.: US 9,209,617 B2
(45) Date of Patent: Dec. 8, 2015

(54) DEVICE AND METHOD FOR PREVENTING ARC FLASHES

(71) Applicants: Anthony S. Locker, Cincinnati, OH (US); Justin Mahaffey, Little Elm, TX (US)

(72) Inventors: Anthony S. Locker, Cincinnati, OH (US); Justin Mahaffey, Little Elm, TX (US)

(73) Assignee: Littlefuse, Inc., Chicago, IL (US)

( * ) Notice: Subject to any disclaimer, the term of this patent is extended or adjusted under 35 U.S.C. 154(b) by 0 days.

(21) Appl. No.: 14/146,043

(22) Filed: Jan. 2, 2014

(65) Prior Publication Data

US 2014/0192451 A1 Jul. 10, 2014

Related U.S. Application Data

(60) Provisional application No. 61/748,915, filed on Jan. 4, 2013.

(51) Int. Cl.
*H02H 5/00* (2006.01)
*H02H 5/04* (2006.01)
*H02H 1/00* (2006.01)

(52) U.S. Cl.
CPC ............... *H02H 5/04* (2013.01); *H02H 1/0023* (2013.01)

(58) Field of Classification Search
CPC .................. H03K 2017/0806; H03K 17/0822; H02H 5/044; H02H 5/04; G06F 1/206
USPC .......................................................... 361/103
See application file for complete search history.

(56) References Cited

U.S. PATENT DOCUMENTS 5,862,030 A * 1/1999 Watkins et al. ............... 361/103

FOREIGN PATENT DOCUMENTS

DE 3900606 A1 7/1990
EP 0869598 A1 10/1998

OTHER PUBLICATIONS

European Search Report dated Apr. 8, 2014, from corresponding European Application No. EP 14 15 0154 (five (5) pages).

* cited by examiner

*Primary Examiner* — Stephen W Jackson
(74) *Attorney, Agent, or Firm* — Kacvinsky Daisak Bluni PLLC

(57) ABSTRACT

A device for preventing arc flashes in electrical systems is provided. The device may include at least one heat sensor for measuring a temperature of an electrical conductor, and a controller operatively coupled to the at least one heat sensor and configured to arrest current in the electrical conductor if the measured temperature exceeds a predefined threshold temperature.

20 Claims, 3 Drawing Sheets

DEVICE AND METHOD FOR PREVENTING ARC FLASHES

RELATED APPLICATIONS

This application claims the benefit of U.S. Provisional Patent Application Ser. No. 61/748,915, filed Jan. 4, 2013, entitled "Device and Method for Preventing Arc-Flashes," which application is incorporated herein by reference in its entirety.

FIELD OF THE DISCLOSURE

The disclosure relates generally to the field of circuit protection devices, and more particularly to a device and method for preventing arc flashes in electrical systems.

BACKGROUND OF THE DISCLOSURE

Electrical connections between components of electrical systems are generally facilitated by numerous conductors that carry electrical current. For example, a copper wire may carry current from a source of electrical power to a device that requires power. A conductor may be insulated to prevent current from leaving the conductor. Under certain circumstances, such as upon the occurrence of an overcurrent condition, an electrical conductor may heat up excessively and cause the insulation surrounding the conductor to melt, thereby exposing the conductor. Upon such exposure, current may be allowed to leave the conductor and travel through the air to a nearby conductive body. This unintended current flowing from the conductor to the nearby conductive body may result in an "electrical arc" or "arc-flash." These arc-flash conditions can cause significant damage to nearby equipment and may cause injury to nearby personnel. The detrimental effects of electrical arcing can be particularly severe in electric power transmission and distribution systems.

Devices are currently available that are capable of detecting arc-flash events and arresting electrical currents in electrical conductors in response to a detected event. For example, arc-flash relays are microprocessor-based devices that employ optical sensors disposed in the vicinity of electrical connection points to detect the onset of an arc-flash. Upon the occurrence of a flash, the arc-flash relay transmits an electrical pulse that trips a circuit breaker supplying the affected system components. The total arcing time is thereby effectively reduced to the mechanical opening time of the circuit breaker. This is a significantly faster response than can be provided by traditional current-measuring relays. There is therefore less damage to electrical equipment and fewer and less severe injuries to personnel.

While arc-flash relays are effective for arresting electrical current and mitigating damage and injury that may result from an arc-flash condition after an arc-flash has already occurred, they are not capable of preventing arc-flashes from occurring in the first place.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

In accordance with the present disclosure, an arc-flash detection device is provided. The arc-flash detection device includes a heat sensor for monitoring a temperature of an electrical conductor and a controller operably coupled to the heat sensor, the controller configured to receive an indication of the temperature of the electrical conductor from the heat sensor and arrest the flow of current in the electrical conductor based on the received temperature.

In accordance with the present disclosure, an electrical system configured to prevent arc-flashes is provided. The electrical system includes a first electrical conductor, a second electrical conductor, and a third electrical conductor for distributing power from a power source to a load and an arc-flash detection device. The arc-flash detection device including a heat sensor for monitoring the temperature of the first electrical conductor, the second electrical conductor, and the third electrical conductor and a controller operably coupled to the heat sensor, the controller configured to receive an indication of the temperature of the first electrical conductor, the second electrical conductor, and the third electrical conductor from the heat sensor and arrest the flow of current in the electrical conductor based on the received temperature.

In accordance with the present disclosure, a method for preventing arc-flashes in electrical systems is provided. The method includes measuring a temperature of an electrical conductor, determining whether the measured temperature exceeds a predetermined threshold, and arresting current in the electrical conductor based on the determination that the measured temperature exceeds a predetermined threshold.

BRIEF DESCRIPTION OF THE DRAWINGS

By way of example, specific embodiments of the disclosed device will now be described, with reference to the accompanying drawings, in which.

DETAILED DESCRIPTION

Figure 1:
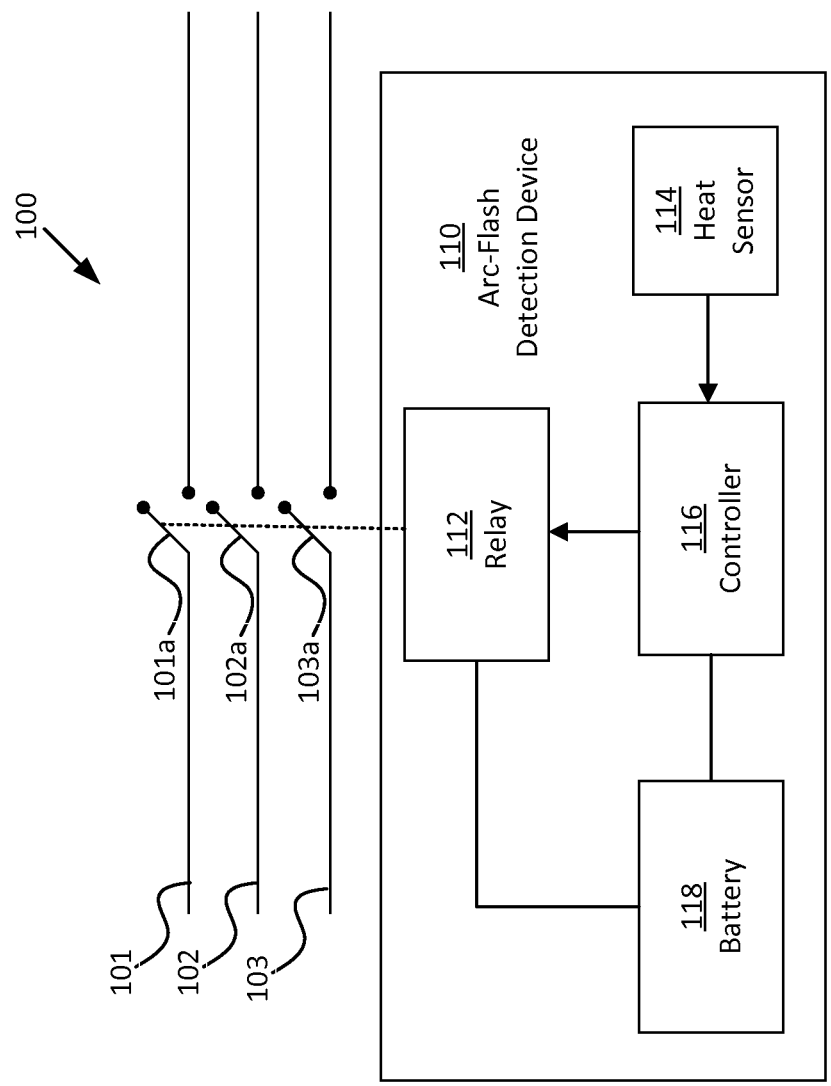
FIG. 1 is a circuit diagram illustrating an exemplary embodiment of an electrical system including an arc-flash detection device for preventing arc-flashes in the electrical system in accordance with the present disclosure.

Various embodiments of the present disclosure will now be described more fully hereinafter with reference to the accompanying drawings. These illustrative embodiments are not intended to be limiting. Rather, these embodiments are provided so that this disclosure will be thorough and complete, and will fully convey the scope of the subject matter. In the drawings, like numbers refer to like elements throughout.

FIG. 1 illustrates an electrical system 100 including an arc-flash detection device 110, arranged according to at least one embodiment of the present disclosure. In general, the arc-flash detection device 110 is configured to detect abnormal conditions in the electrical system 100 and arrest current in response to such abnormal conditions. The electrical system 100 is shown including three electrical conductors 101, 102, and 103, which may for example, be used in a three-phase power distribution and/or transmission network. It is noted, that although three electrical conductors are illustrated in FIG. 1, this is not intended to be limiting. More specifically, the arc-flash detection device 110 may be configured to detect abnormal conditions and arrest current in more or less than three electrical conductors.

The electrical conductors 101, 102, and 103 are shown including disconnects or switches 101a, 102a, and 103a that may be opened (described in greater detail below) in order to arrest the flow of current through the electrical conductors 101, 102 and 103. The switches 101a, 102a, and 103a are shown operably connected to the arc-flash detection device 110.

During operation, the arc-flash detection device 110 may detect a fault condition that indicates an impending arc-flash and cause the switches 101a, 102a, and 103a to open to arrest the flow of current in the electrical conductors 101, 102, and 103 and prevent the arc-flash from occurring. It is to be appreciated, that the use of the term "impending arc-flash" is not intended to indicate that an arc-flash will necessarily occur. Instead, it is intended to indicate a condition which may indicate that an arc-flash might occur. Due to the dangerous nature of arc-flashes, it may be desired to avoid these conditions and/or arrest the flow of current if such conditions occur as a precaution to prevent the occurrence of arc-flashes.

The arc-flash detection device 110 includes a relay 112, a heat sensor 114, a controller 116, and a battery 118. It is to be appreciated that although the components of the arc-flash detection device 110 are depicted in FIG. 1 as being included in a single device, this is not intended to be limiting. More specifically, the heat sensor 114 may, in some examples, be external to a housing of the arc-flash detection device 110. Furthermore, although a single heat sensor 114 is depicted, multiple heat sensors 114 may be provided. An example with multiple heat sensors disposed in an electrical system is described in greater detail below with respect to FIG. 2.

In some examples, the heat sensor 114 may be an infrared sensor (e.g. infrared camera) or other contact or non-contact type of heat sensor. The heat sensor 114 may be positioned to monitor the temperature of the electrical conductors 101, 102, and/or 103 of the electrical system 100. The heat sensor 114 may be configured to output a signal indicting the temperature of the electrical conductors. More specifically, the heat sensor 114 may be configured to send a signal to the controller 116 indicating the measured and/or monitored temperature. In some examples, the heat sensor 114 may be connected to the controller 116 via various wired transmission means (e.g., serial connection, universal serial bus, Ethernet, or the like). In some examples, the heat sensor 114 may be connected to the controller 116 via various wireless transmission means (e.g., RF, WiFi, Bluetooth, or the like).

The controller 116 can receive signals from the heat sensor indicating the temperature of the electrical conductors 101, 102, and 103. In some examples, the controller 116 may be a microcontroller, microprocessor, field programmable gate array, application specific integrated circuit, or the like. The controller 116 may be configured to determine if the monitored temperatures exceed a predefined threshold temperature. The threshold temperature can be a temperature that defines a boundary between a safe operating condition and an abnormal operating condition. In some examples, the threshold temperature can correspond to a temperature value that indicate an impending arc-flash or the potential for an arc-flash to occur. For example, an overcurrent condition in an electrical conductor may cause the temperature of the electrical conductor to rise above a predefined threshold temperature. If the overcurrent condition and associated elevated temperature in an electrical conductor are allowed to persist, the insulation surrounding the electrical conductor may melt or separate, and an arc-flash may thereby occur.

It is to be appreciated, that the threshold temperature may be different depending upon the electrical system. With some examples, the threshold temperature may depend upon the type of electrical conductors in the electrical system 100, the insulation surrounding the electrical conductors, the components and/or circuitry nearby the electrical conductors, or the like. With some examples, the controller 116 may be implemented to have a programmable and/or adjustable threshold temperature. As such, the arc-flash detection device 110 may be configured to be implemented in a variety of different types of electrical systems (e.g., power distribution and/or transmission systems) and the threshold temperature may be set to correspond to an appropriate threshold temperature for the particular type of electrical system in which the arc-flash device is installed.

With some examples, the controller 116 may be configured to determine a fault condition (e.g. condition indicative of an impending arc-flash) based on the monitored temperatures. In some examples, the controller 116 may determine the fault condition exists if the temperature of all the monitored electrical conductors exceeds the threshold temperature. In some examples, the controller 116 may determine the fault condition exists if the temperature of one of the monitored electrical conductors exceeds the threshold temperature. In some examples, the controller 116 may determine the fault condition exists if the average of the monitored temperatures exceeds the threshold temperature.

The controller 116 is operably connected to the relay 112 and configured to send a signal to the relay 112 indicating the occurrence of the fault condition. More specifically, the controller 116 may receive the temperature of the electrical conductors as monitored by the heat sensor 114, determine that a fault condition exists based on the monitored temperatures, and send a signal to the relay 112 to arrest the flow of current in the electrical conductors. The relay 112 may cause the switches 101a, 102a, and 103a to open based on receiving the signal from the controller 116, thereby arresting the flow of current in the electrical conductors 101, 102 and 103. In some examples, the relay 112 and the controller 116 may be implemented in a single device. For example, if the switches 101a, 102a, and 103a are electronic switches and/or electronically controlled switches, the controller 116 may be configured to receive temperature data from the heat sensor 114, determine if the temperature of the electrical conductors exceeds the temperature and then send a signal to the switches to cause the switches to open.

With some examples, the controller 116 and the relay 112 may be configured to arrest the flow of current in one or more of the electrical conductors 101, 102, and/or 103. For example, with some embodiments, the controller 116 and the relay 112 may arrest the flow of current in one of the electrical conductors that has a measured temperature exceeding the threshold temperature. More specifically, with some embodiments the flow of current in those electrical conductors whose temperature exceeds the threshold temperature may be arrested while the flow of current in the other electrical conductors may not be arrested. In some examples, the flow of current in all electrical conductors may be arrested if the temperature of at least one of the electrical conductors exceeds the threshold temperature.

The arc-flash detection device 110 may further include a battery 118 to supply power to the controller 116 and/or the relay 112. With some examples, the battery 118 may also supply power to the heat sensor 114. In some examples, the heat sensor 114 may have a different power source. For example, with some embodiments, the heat sensor 114 may have another battery (not shown). With some examples, the arc-flash detection device 110 may be configured to draw power from one or more of the electrical conductors 101, 102, and/or 103. Embodiments are not limited in this context.

Figure 2:
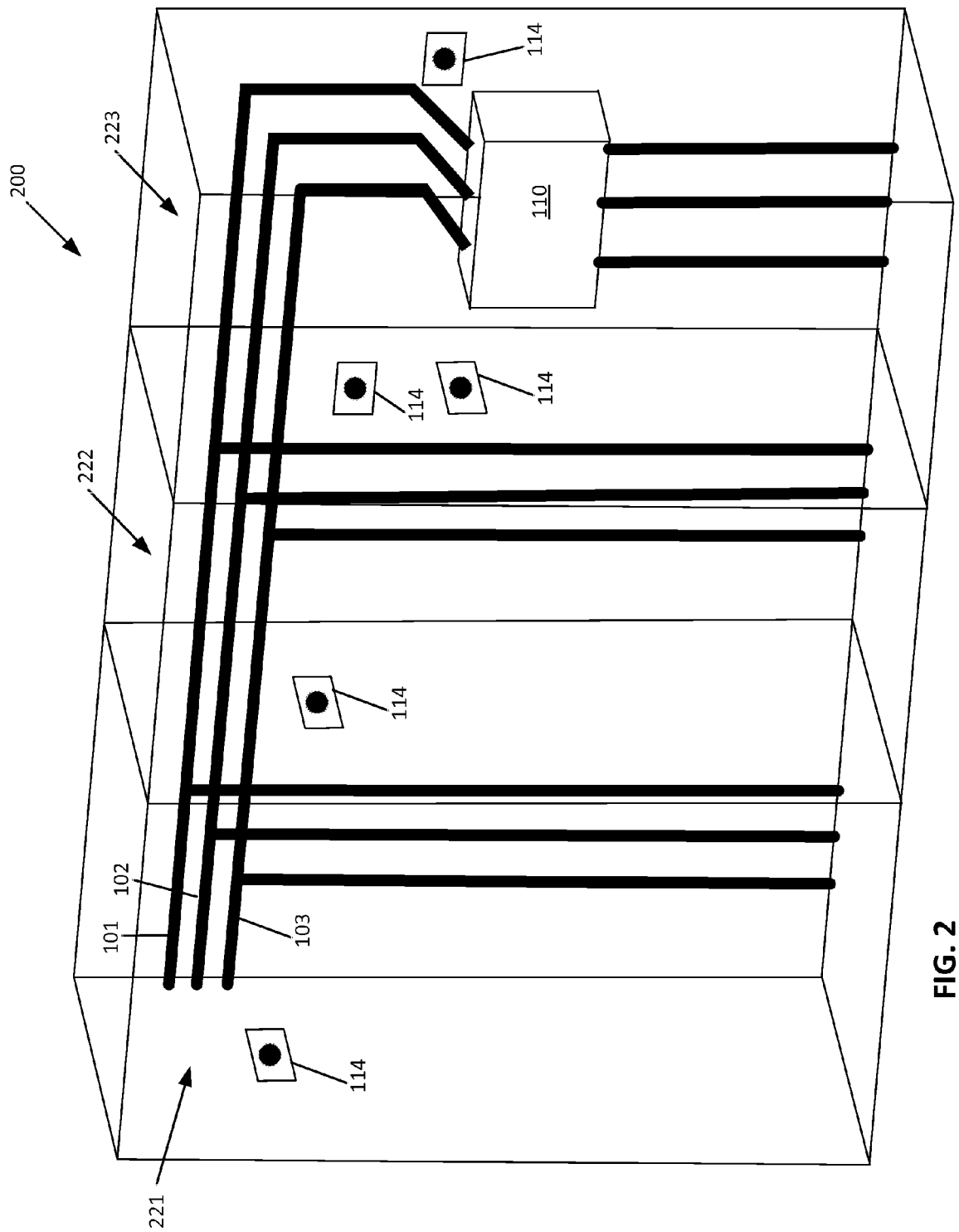
FIG. 2 is perspective view illustrating an exemplary installation of an arc-flash detection device for preventing arc-flashes in electrical systems in accordance with the present disclosure.

FIG. 2 depicts an example perspective view of an illustrative installation of the arc-flash detection device 110 of FIG. 1 in an electrical system 200. The electrical system 200 is depicted including electrical cabinets 221, 222, and 223. It is to be appreciated, that the electrical cabinets 221, 222, and 223 may correspond to a variety of different areas of an electrical system. The electrical conductors 101, 102, and 103 are also installed in the electrical system 200. In particular, the electrical conductors 101, 102, and 103 are depicted as being routed through the electrical cabinets 221, 222, and 223. In some examples, the electrical conductors 101, 102, and 103 may correspond to a three-phase power system (e.g., power distribution and/or power transmission, or the like). In some examples, the electrical conductors 101, 102, and 103 may be configured to electrically connect a power source to one or more load devices.

The arc-flash detection device 110 is disposed within one of the electrical cabinets. More specifically, the arc-flash detection device 110 is depicted disposed (e.g. installed) within the electrical cabinet 223. The arc-flash detection device 110 includes a number of heat sensors 114. These heat sensors 114 are disposed (e.g., installed) in various locations in the electrical system 200. More specifically, at least one of the heat sensors 114 is disposed in each of the electrical cabinets 221, 222, and 223.

In various examples, the heat sensors 114 may be disposed on or within various portions of the electrical cabinets (e.g., breaker compartments, drawers, doors, walls and generally anywhere else where there is a potential for an arc-fault). With some examples, the heat sensors 114 may be positioned to monitor temperatures of the electrical conductors 101, 102, and 103. More specifically, each of the heat sensors 114 may be position to monitor the temperature of a portion of the electrical conductors. For example, the heat sensor 114 disposed in the electrical cabinet 221 may be configured to monitor the temperature of the portions of the electrical conductors 101, 102, and 103 disposed in the electrical cabinet 221. Similarly, the heat sensors 114 disposed in the electrical cabinet 222 may be configured to monitor the temperature of the portions of the electrical conductors 101, 102, and 103 disposed in the electrical cabinet 222. Likewise, the heat sensors 114 disposed in the electrical cabinet 223 may be configured to monitor the temperature of the portions of the electrical conductors 101, 102, and 103 disposed in the electrical cabinet 223.

It is to be appreciated that although not shown in FIG. 2, the arc-flash detection device 110 also includes the relay 112 and the controller 116. During operation, the heat sensors 114 disposed in the electrical system 200 may repeatedly (e.g., at specified intervals, randomly, or the like) send signals indicating the temperature of the monitored electrical conductors to the controller 116. The controller 116 may determine if the monitored temperatures exceed a threshold temperature and send a signal to the relay 112 indicating the detection of the fault condition. The relay 112 may cause one or more of the switches (e.g., refer to FIG. 1) to open thereby arresting the flow of current in the corresponding electrical conductors.

With some examples, the arc-flash detection device 110 may be operably connected to a computing device (e.g., server, desktop, laptop, tablet computer, smart phone, or the like). The arc-flash detection device 110 may be connected to the computing device via wired and/or wireless connection means (e.g., serial connection, universal serial bus, Ethernet, RF, WiFi, Bluetooth, or the like). The arc-flash detection device 110 may be connected to the computing device to allow an operator to observe the temperatures of the monitored electrical conductors. For example, the controller 116 may be configured to transmit to the computing device the monitored temperatures and/or any detected fault conditions (e.g., determinations of when the monitored temperatures exceed the threshold temperature, or the like).

Figure 3:
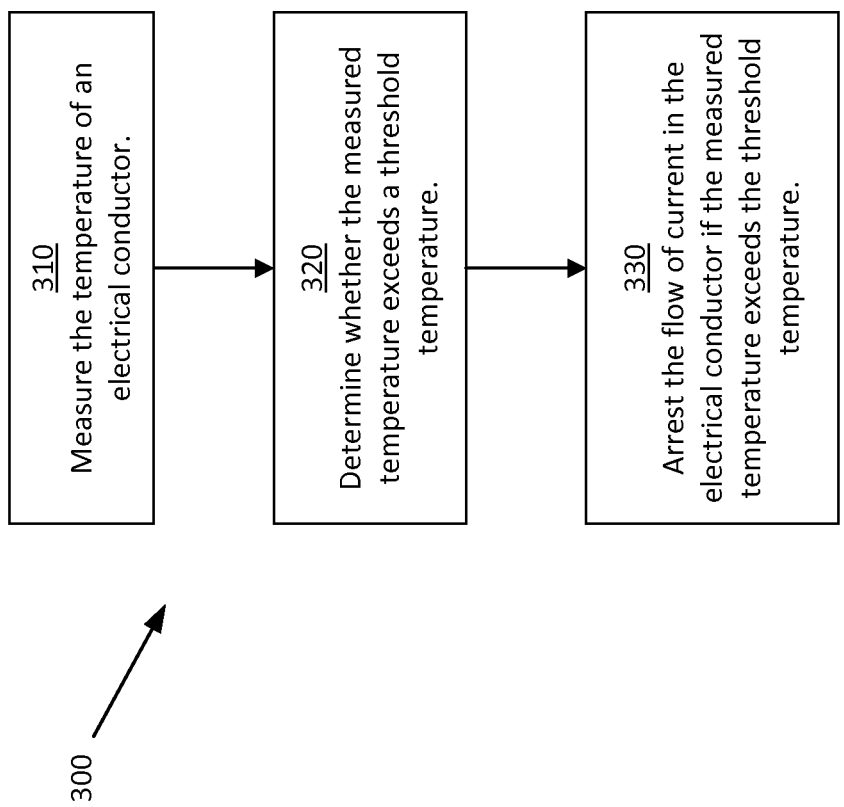
FIG. 3 is a flow diagram illustrating an exemplary method for preventing arc-flashes in electrical systems in accordance with the present disclosure.

FIG. 3 depicts a flow diagram depicting an exemplary method 300 for preventing arc-flashes in an electrical system in accordance with the present disclosure. It will be appreciated that although the method 300 is described with reference to the electrical system 100 and the arc-flash detection device 110, examples are not limited in this context.

The method 300 may begin at block 310. At block 310, measure the temperature of an electrical conductor, the heat sensor 114 may measure the temperature one of the electrical conductors 101, 102, and/or 103. It is to be appreciated that the temperature of more than one heat sensor 114 may be measured at block 310.

Continuing to block 320, determine whether the measured temperature exceeds a threshold temperature, the controller 116 may determine whether the temperature measured by the heat sensor 114 exceeds a threshold temperature.

Continuing to block 330, arrest the flow of current in the electrical conductor if the measured temperature exceeds a threshold temperature, the relay 112 may cause the switch (e.g., 101*a*, 102*a*, and/or 103*a*) of the electrical conductor (e.g., 101, 102, and/or 103) corresponding to the measured temperature to open, thereby arresting the flow of current in the electrical conductor.

Thus, a device and method of preventing arc-flashes in an electrical system has been disclosed. The above described arc-flash detection device, illustrative installation, and associated method may be implemented to prevent arc-flashes in an electrical system and thereby reduce the damage and/or injury resulting from arc-flashes.

While the present disclosure has been presented with reference to certain embodiments, numerous modifications, alterations and changes to the described embodiments are possible without departing from the sphere and scope of the present disclosure, as defined in the claims. Accordingly, it is intended that the present disclosure not be limited to the described embodiments, but that it has the full scope defined by the language of the following claims, and equivalents thereof.

The invention claimed is:

1. An arc-flash detection device for preventing arc-flashes in an electrical system, the arc-flash detection device comprising:
   a heat sensor for monitoring a temperature of an electrical conductor, the heat sensor being a non-contact heat sensor; and
   a controller operably coupled to the heat sensor, the controller configured to receive an indication of the temperature of the electrical conductor from the heat sensor and arrest a flow of current in the electrical conductor based on the monitored temperature.

2. The arc-flash detection device of claim 1, further comprising a relay operably connected to the controller, the relay further operably connected to a switch disposed in line in the electrical conductor, the relay configured to receive an signal from the controller to arrest the flow of current in the electrical conductor and cause the switch to open based on the received signal.

3. The arc-flash detection device of claim 2, wherein the controller is configured to compare the temperature of the electrical conductor to a threshold temperature.

4. The arc-flash detection device of claim 3, wherein the controller is configured to:
  determine whether the temperature of the electrical conductor exceeds the threshold temperature; and
  determine the flow of current should be arrested based on the determination that the temperature of the electrical conductor exceeds the threshold temperature.

5. The arc-flash detection device of claim 2, wherein the electrical conductor is a first electrical conductor, the heat sensor further configured to monitor a temperature of a second electrical conductor and a third electrical conductor and send an indication of the temperature of first electrical conductor, the second electrical conductor, and the third electrical conductor to the controller.

6. The arc-flash detection device of claim 5, wherein the controller is configured to compare the temperature of the first electrical conductor, the temperature of the second electrical conductor, and the temperature of the third electrical conductor to a threshold temperature.

7. The arc-flash detection device of claim 5, wherein the controller is configured to compare an average of the temperatures of the first electrical conductor, the second electrical conductor, and the third electrical conductor to a threshold temperature.

8. The arc-flash detection device of claim 5, wherein the first conductor, the second conductor, and the third conductor are electrical conductors in a three-phase power system.

9. The arc-flash detection device of claim 1, wherein the heat sensor is a first non-contact heat sensor for monitoring the temperature of a first portion of the electrical conductor, the arc-flash detection device further comprising a second non-contact heat sensor for monitoring the temperature of a second portion of the electrical conductor.

10. The arc-flash detection device of claim 9, wherein the first and second non-contact heat sensors are wirelessly coupled to the controller.

11. An electrical system configured to prevent arc-flashes comprising:
  a first electrical conductor, a second electrical conductor, and a third electrical conductor for distributing power from a power source to a load; and
  an arc-flash detection device comprising:
  a heat sensor for monitoring a temperature of the first electrical conductor, the second electrical conductor, and the third electrical conductor, the heat sensor being a non-contact heat sensor; and
    a controller operably coupled to the heat sensor, the controller configured to receive an indication of the temperature of the first electrical conductor, the second electrical conductor, and the third electrical conductor from the heat sensor and arrest a flow of current in the electrical conductor based on the monitored temperature.

12. The electrical system of claim 11, the arc-flash detection device further comprising a relay operably connected to the controller, the relay further operably connected to at least one switch disposed inline in the first, the second, and the third electrical conductor, the relay configured to receive an indication from the controller to arrest the flow of current in the first, the second, and the third electrical conductor and cause the switch to open based on the monitored temperature.

13. The electrical system of claim 12, wherein the controller is configured to compare the temperature of the first electrical conductor, the second electrical conductor and the third electrical conductor to a threshold temperature and determine the flow of current should be arrested based on the comparison.

14. The electrical system of claim 13, wherein the controller is configured to:
  determine whether the temperature of the first, the second, and the third electrical conductor exceeds the threshold temperature; and
  determine the flow of current should be arrested based on the determination that the temperature of the first, the second, and the third electrical conductor exceeds the threshold temperature.

15. The electrical system of claim 11, wherein the first conductor, the second conductor, and the third conductor are electrical conductors in a three-phase power system.

16. The electrical system of claim 11, wherein the heat sensor is a first non-contact heat sensor for monitoring the temperature of a first portion of the first, the second, and the third electrical conductors, the arc-flash detection device further comprising a second non-contact heat sensor for monitoring the temperature of a second portion of the first, the second, and the third electrical conductors.

17. A method for preventing arc-flashes in electrical systems comprising:
  measuring, by a non-contact heat sensor, a temperature of an electrical conductor;
  determining, by a controller operably coupled to the heat sensor, whether the measured temperature exceeds a predetermined threshold; and
  arresting current in the electrical conductor based on the determination that the measured temperature exceeds a predetermined threshold.

18. The method of claim 17, wherein measuring the temperature of the electrical conductor comprises receiving a signal from the non-contact heat sensor, the signal corresponding to the temperature of the electrical conductor.

19. The method of claim 18, wherein the electrical conductor is a first electrical conductor, the method further comprising measuring the temperature of a second electrical conductor and a third electrical conductor.

20. The method of claim 17, wherein the non-contact heat sensor comprises a first non-contact heat sensor and a second non-contact heat sensor,
  wherein measuring the temperature of the electrical conductor comprises:
    receiving a first signal from the first non-contact heat sensor, the first signal corresponding to the temperature of a first portion of the electrical conductor; and
    receiving a second signal from the second non-contact heat sensor, the second signal corresponding to the temperature of a second portion of the electrical conductor.

* * * * *